Feb. 2, 1965  R. F. EDGAR  3,168,673
ELECTRODE POSITIONING MEANS
Filed Aug. 8, 1961  2 Sheets-Sheet 1
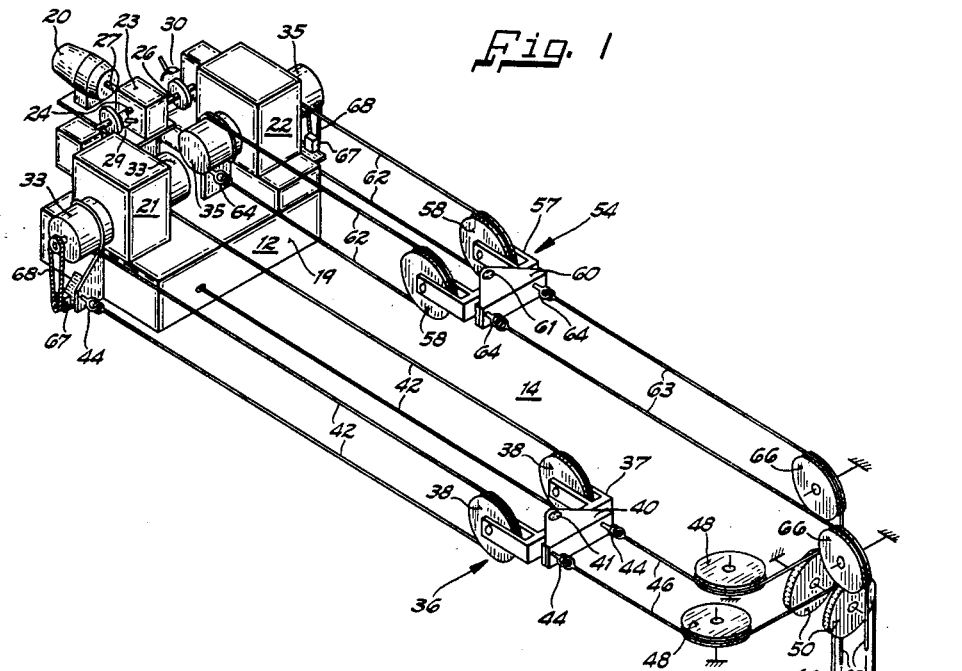
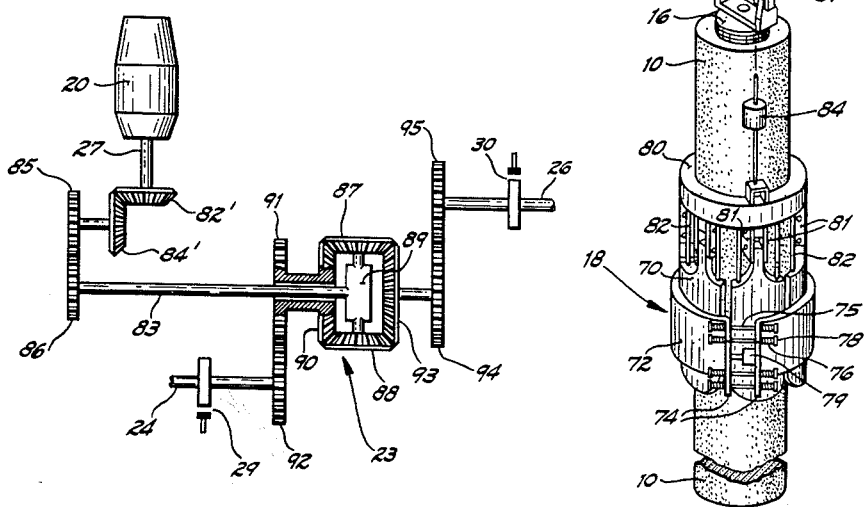
INVENTOR.
Robert F. Edgar
BY
Fred Wivrott
Attorney

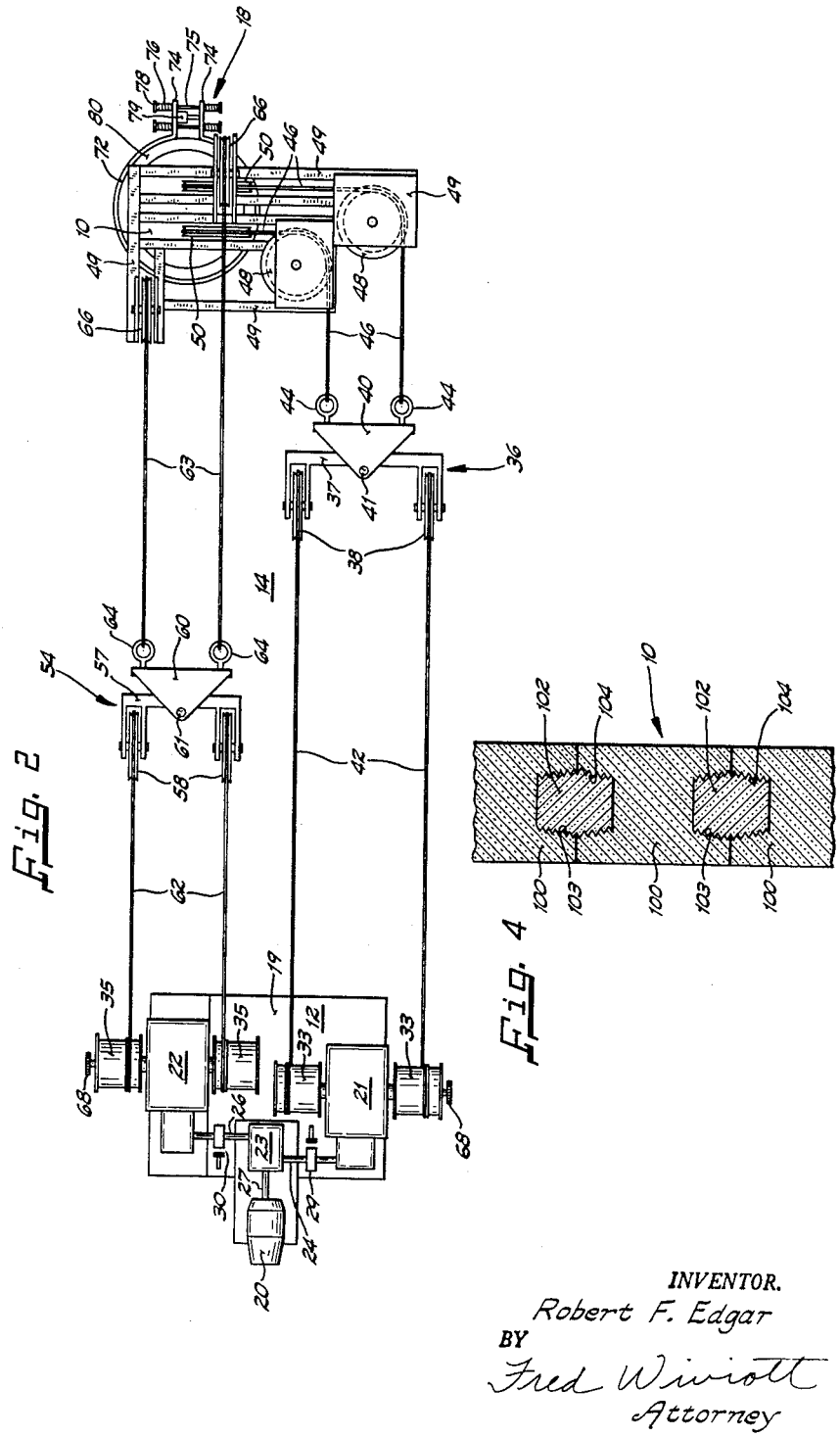

United States Patent Office 3,168,673
Patented Feb. 2, 1965

3,168,673
ELECTRODE POSITIONING MEANS
Robert F. Edgar, Pittsburgh, Pa., assignor to McGraw-Edison Company, Milwaukee, Wis., a corporation of Delaware
Filed Aug. 8, 1961, Ser. No. 130,140
2 Claims. (Cl. 314—69)

This invention relates to electric furnaces and, more particularly, to means for supporting and positioning an electrode relative to the charge in an electric arc furnace.

In certain types of electric furnaces the electrodes are supported and positioned relative to the furnace charge by means of cables and motor powered drums or winches driven in accordance with variations in the electrode voltage and current. The cables are affixed to a plug attached to the end of the electrode and an electrode clamp secured intermediate the electrode's ends. Because such electrodes are consumed, worn off and broken away during normal furnace operation, it becomes necessary periodically to move the clamp to a higher location on the electrode. This is accomplished by loosening the clamp and pulling in the cables connected to it while the cables connected to the electrode plug are held stationary, thereby moving the clamp outwardly relative to the furnace. After the clamp has reached its new location it is reclamped and normal operation may then resume. This procedure is called slipping the electrode.

When it is desired to add an additional section to the electrode, the plug is removed from the upper end thereof and the cable connected to it to a position clear of the new section which is then added. The plug is then lowered and inserted into the top of the added section. During this operation, the cables connected to the electrode clamp are held stationary.

Prior art electrode positioning apparatus of this type required a plurality of independent motors for positioning and slipping the electrode. Such apparatus generally required several floors of head room above the furnace.

It is an object of the invention to provide a new and improved apparatus for supporting and regulating an electrode and for slipping the electrode relative to its clamp or holder. Another object of the invention is to provide such electrode positioning apparatus which may be housed on a single floor.

A further object of the invention is to provide means for supporting, regulating and slipping an electrode in which only a single positioning motor is required.

These and other objects and advantages of the invention will become more apparent from a detailed description of a preferred embodiment thereof taken with the accompanying drawings in which:

FIG. 1 is a perspective view of the holding and positioning apparatus according to the preferred embodiment of the instant invention;

FIG. 2 is a top plan view of the apparatus shown in FIG. 1;

FIG. 3 schematically illustrates a differential gear mechanism used with the preferred embodiment of the instant invention; and FIG. 4 is a cross-sectional view of an electrode usable with the instant invention.

In general terms, the invention comprises in an electric arc furnace having an electrode and an electrode clamp releasably coupled to the electrode, the combination of a reversible motor and first and second output means coupled to the electrode and the electrode holder respectively. In addition, means are provided for operatively coupling the motor to each of the output means for simultaneous operation and for selectively actuating one of said output means from said motor independently of the other.

According to a more specific aspect of the invention, means are provided for selectively locking one of the first and second output means so that the electrode and holder may be moved independently of each other relative to the furnace. In addition, the coupling means between the motor and the first and second output means comprises a differential gear mechanism.

Referring now to the drawings in greater detail, FIG. 1 shows an electrode 10 of an electric arc furnace (not shown) connected to a hoisting mechanism 12 by a suspension system 14. The suspension system is connected to the electrode 10 by means of a plug 16 screwed into a threaded hole on the end of the electrode and an electrode clamp assembly 18 which compressively embraces the electrode 10 intermediate its ends. It will be appreciated that in a polyphase system, there will be an electrode and a supporting and positioning assembly for each phase.

As best seen in FIG. 2, the hositing mechanism 12 is mounted on a frame 19 and includes a reversible motor 20 whose speed and direction of rotation is controlled in accordance with the voltage and current conditions of the electrode 10. Regulating systems for controlling the motor 20 in accordance with these electrical quantities are well known in the art and form no part of the instant invention and, accordingly, none have been illustrated for the sake of brevity. It will be sufficient for the purposes of this discussion to state that when the arc between the electrode 10 and the furnace charge (not shown) becomes too long, as indicated by an increase in arc voltage and a decrease in arc current, the motor 20 will turn in a first direction causing the electrode to be lowered toward said charge to thereby reduce the arc length. Conversely, when the arc becomes too short, as indicated by an increase in arc current and a decrease in arc voltage, the motor 20 will be rotated in an opposite direction thereby raising the electrode 10. For purposes which will become apparent from the ensuing discussion, motor 20 may be selectively connected for automatic operation by the regulating system or switched to auxiliary enerizing circuits for operation in either an electrode raising or an electrode lowering direction.

As shown in FIGS. 1 and 2, a pair of speed reducing mechanisms 21 and 22 are adapted to be driven by the motor 20 through the agency of a differential gearing apparatus 23 having a pair of output shafts 24 and 26 connected to the speed reducing mechanisms 21 and 22 respectively and an input shaft 27 connected to the motor 20. In addition, the output shafts 24 and 26 are respectively provided with brakes 29 and 30. The details of the speed reducing mechanisms 21 and 22 have not been shown and form no part of the instant invention but may be of any well known type. For the purpose of this discussion it is sufficient to state that the mechanisms 21 and 22 are constructed and arranged so their output shafts rotate in opposite directions when driven by the motor through the differential, and each has a pair of output drums 33 and 35 respectively. Similarly, the brakes 29 and 30 may be of any well known type and may be individually and selectively actuated in any well known manner.

The suspension system 14 includes a first sheave assembly 36 having a sheave carrier 37 which supports a pair of parallel sheaves 38 and a yoke 40 which is pivotally connected to the sheave carrier 37 by means of a pin 41. A cable 42 extends around each of the sheaves 38 and each is connected at one end to one of the drums 33 and deadended at its other end to an eyebolt 44 affixed to the frame 19 at a point below its corresponding drum 33. As seen in FIG. 1, the cables 42 extend from the underside of drums 33 to the sheaves 38 so that rotation of said drums in a clockwise direction will reel in the cables 42 to thereby move the sheave assembly 36 to the left or toward the assembly 12. Conversely, rotation of the drums 33 in a counterclockwise direction will feed the cables 42 out thereby allowing the sheave assembly 36 to move toward the right.

A pair of eyebolts 44, affixed to the front of the yoke 40, support a pair of cables 46 which extend around a first pair of adjacently disposed sheaves 48 which are each horizontally mounted for rotation on a frame 49 around a fixed vertical axis. In addition, cables 46 also extend around a second pair of coaxial sheaves 50 which are rotatably mounted in frame 49 about a fixed horizontal axis and above the electrode 10. The lower ends of the cables 46 are attached to a pair of vertical arms 51 which are integral with the plugs 16. It will be appreciated, therefore, that movement of the sheave assembly 36 to the left, under the influence of clockwise rotation of the drums 33, will tend to raise the electrode 10 vertically, and conversely, counterclockwise rotation of drums 33 will tend to lower the electrode 10 toward the furnace (not shown).

The second sheave assembly 54 is similar to assembly 36 and includes a sheave carrier 57, a pair of sheaves 58 and a yoke 60 pivotally connected by a pin 61 to the sheave carrier 57. A cable 62 extends around each of the sheaves 58 and each is connected at one end to one of the drums 35 of the speed reducing mechanism 22 and at its other end to an eyebolt 64 affixed to the frame 19 below its corresponding drums 35. A second pair of cables 63 are connected to eyebolts 64 affixed to the front of a yoke 60 pivotally mounted by a pin 61 to the sheave carrier 57. In addition, the cables 63 extend from the eyebolts 64 to the electrode clamp 18 around a pair of vertically disposed sheaves 66 which are mounted on frame 49 for rotation about fixed horizontal axes and above the electrode 10. As seen in FIG. 1, the cables 62 extend around the upper side of drums 35 so that rotation of said drums in a clockwise direction will allow the sheave assembly 54 to move toward the right tending to lower the electrode clamp 18. Conversely, counterclockwise rotation of drums 35 will move the sheave assembly 54 to the left thereby tending to raise the electrode clamp. A pair of limit switches 67 are connected to each of the drums 33 and 35 by chains 68 to prevent overtravel of the sheave assemblies 36 and 54.

The electrode clamp 18, shown in FIG. 1, includes a plurality of contact shoes 70 which are composed of an electrical conductive material, such as copper, and which are held in high pressure engagement with the surface of electrode 10 by a clamping band 72. The band 72 surrounds the contact shoes 70 and has a pair of radially extending clamping lugs 74 which are disposed on each side of the free ends of the band 72. A plurality of tie bars 75 extend through aligned openings in each of the lugs 74 and each carries a pair of compression springs between a head 78 on each of its outer ends and the outer surface of each of the lugs 74. As a result, springs 76 tend to move the lugs 74 toward each other to thereby clamp the contact shoes 70 against the surface of the electrode 10 to permit the transfer of electric current therebetween and also to support the weight of said electrode. A piston and cylinder assembly 79 is disposed between the lugs 74 and is operative upon being pressurized to force said lugs apart in opposition to the springs 76 and thereby release the contact shoes 70 from high pressure engagement with the electrode 10. This allows relative sliding movement between the clamp 18 and the electrode 10.

Each of the contact shoes 70 is pivotally connected at its upper end to a bus ring 80 by an arm 81. A plurality of copper tubes 82, extending between the ring 80 and the contact shoes 70, provide an electrical current path therebetween. The bus ring 80 is, in turn, connected to a source of electrical flexible cables and bus bars which are not shown but which are well known in the art. An electrical insulating member 84 is interposed in the cable 63 to insulate the suspension assembly 14 from the bus ring 80, while the plug 16 is also suitably insulated from the cables 46.

The differential 23, which is schematically illustrated in FIG. 3, is driven by a pinion 82 mounted on the end of the input shaft 27. The pinion 82 drives a differential shaft 83 through gears 84, 85 and 86. Shaft 83 carries a pair of pinion gears 87 and 88 at the opposite ends of a transverse arm 89 for driving the output shafts 24 and 26 through gears 90, 91, 92, and 93, 94, 95, respectively. It can also be seen that if either of the brakes 29 or 30 is engaged the differential 23 will drive the other output shaft independently of the one that is held by its respective brake. It will be understood that while one particular type of differential mechanism 23 is illustrated any well known type operable to drive a pair of output shafts simultaneously or to drive each shaft individually if the other is held, may be employed.

During automatic operation of the system, the brakes 29 and 30 are off. Thus, the signal to change the position of electrode 10 energizes the motor 20 to drive each of the speed reducing mechanisms 21 and 22. Since the electrode holder 18 is mechanically coupled to the electrode 10 by means of clamping band 72, tension on cables 46 and 63 will be substantially equal so that the electrode is moved through the agency of both the clamp 18 and the plug 16.

When it is desired to slip the electrode 10 relative to the clamp 18, or in effect to hold the electrode 10 stationary and raise the clamp 18 to a new position, brake 29 is engaged to lock speed reducing mechanism 21 and thus the electrode 10 in position. With the electrode thus supported, the piston and cylinder assembly 79 is pressurized to release the holder 18. The motor 20 is then operated in a direction which rotates the drums 35 in a counterclockwise direction thereby moving the sheave assembly 54 toward the left as viewed in FIGS. 1 and 2. This moves the clamp 18 vertically relative to the electrode 10 through the agency of the cable 63. When the new position of the clamp 18 is reached the pressure in the cylinder assembly 79 is removed thereby returning clamping pressure between the contact shoes 70 and the surface of the electrode 10. Brake 29 is then released so that automatic operation of the assembly may proceed in the normal manner.

As seen in FIG. 4, electrode 10 is composed of a plurality of cylindrical sections 100 which are endwise connected by means of a threaded plug 102 and a pair of tapped holes 103 and 104 at the lower and upper ends respectively of each section. When the electrode 10 has been consumed to the point where an additional section 100 is required, brake 30 is engaged thereby locking the shaft 26 to prevent vertical movement of the electrode holder 18 so that the electrode 10 is supported in position. The motor 20 is then operated in a direction which will drive the drum 33 in a counterclockwise direction to remove the tension from cables 46. The plug 16 is then removed from the tapped hole 104 in the uppermost electrode section 100 and the motor 20 is operated to move the sheave assembly 36 to the left, as viewed in FIGS. 1 and 2, thereby raising the plug 16 until it wil clear the new section which is then brought into position and added to the electrode 10. The plug 16 is then lowered toward and affixed to the hole 104 in the upper end of the added section 100. Tension is then returned to cables 46 and the brake 30 is released. The assembly is again ready for automatic operation.

If it is desired to slip the electrode without removing the power flow thereto, the brake 30 is engaged. Motor 20 is then operated in a direction to produce a slight amount of slack in cables 46. Brake 29 is then engaged. Pressure is then applied slowly to the cylinder assembly 79 until the electrode slips down through the clamp 18 and returns tension to the cables 46. While the clamping pressure between the contact shoes 70 and the electrode 10, during this procedure, is insufficient to support the weight of the electrode, it is enough to maintain electrical contact. Brake 30 is then released and motor 20 is operated in a direction to produce counterclockise rotation of drums 35, thereby moving ropes 63 to the left and raising electrode holder 18 up relative to electrode 10 to a new position. After the cylinder 79 has been vented to return clamping pressure to the clamp 18 the brake 29 is released so that automatic operation may then proceed.

While only a single embodiment of the instant invention has been shown and described, and while the invention has been illustrated and discussed with respect to a particular electrode suspension and clamp assembly, it is not intended that the invention be limited thereby but only by the scope of the appended claims.

I claim:

1. In an electric arc furnace having an electrode, the combination of a reversible electric motor, first and second shaft means, an electrode clamp for releasably engaging said electrode, a first cable assembly connecting said first shaft means and to said electrode, a second cable assembly connecting said second shaft means and to said clamp, each of said cable assemblies including drum means connected to its respective shaft means and a movable and a fixed sheave, each of said cable assemblies also including one cable extending around said movable sheave and having one end fixed and the other end wound around said drum and a second cable extending from said movable sheave around said fixed sheave to its respective point of connection with said electrode and said clamp, differential gear means having an input coupled to said motor and a pair of outputs which are each connected to a different one of said first and second shaft means, said differential gear means being constructed and arranged to simultaneously rotate each of said output shafts in the same direction, said first and second cable assemblies being moved in an electrode raising direction upon rotation of said motor in a first direction and in an electrode lowering direction upon rotation of said motor in an opposite direction, and a brake connected to each of said first and second shaft means for selectively locking the same, said differential gear means also being constructed and arranged to individually rotate one of said output shafts when the other is locked, so that said electrode and said holder may be moved independently of each other relative to said furnace.

2. The electric arc furnace set forth in claim 1 wherein first and second speed reducing means are connected between said first and second shaft means and said first and second cable assemblies, respectively.

References Cited in the file of this patent

UNITED STATES PATENTS

| 1,065,380 | Marshall | June 24, 1913 |
| 1,377,844 | McCutchen et al. | May 10, 1921 |

FOREIGN PATENTS

| 583,119 | Great Britain | Dec. 10, 1946 |
| 598,462 | Great Britain | Feb. 18, 1948 |